(12) United States Patent
Ramus

(10) Patent No.: US 9,859,933 B2
(45) Date of Patent: Jan. 2, 2018

(54) DEVICE FOR CONTROL BY RADIOFREQUENCY SIGNALS OF A DOMESTIC ELECTRICAL APPLIANCE, ASSOCIATED DOMESTIC ELECTRICAL APPLIANCE AND HOME AUTOMATION INSTALLATION COMPRISING SUCH AN APPLIANCE

(71) Applicant: SOMFY SAS, Cluses (FR)

(72) Inventor: Michel Ramus, Amancy (FR)

(73) Assignee: SOMFY SAS, Cluses (FR)

( * ) Notice: Subject to any disclaimer, the term of this patent is extended or adjusted under 35 U.S.C. 154(b) by 0 days.

(21) Appl. No.: 15/526,466

(22) PCT Filed: Nov. 16, 2015

(86) PCT No.: PCT/EP2015/076696
§ 371 (c)(1),
(2) Date: May 12, 2017

(87) PCT Pub. No.: WO2016/079056
PCT Pub. Date: May 26, 2016

(65) Prior Publication Data
US 2017/0310351 A1 Oct. 26, 2017

(30) Foreign Application Priority Data
Nov. 18, 2014 (FR) ..................... 14 61145

(51) Int. Cl.
*H04B 1/00* (2006.01)
*H04B 7/00* (2006.01)
(Continued)

(52) U.S. Cl.
CPC ................ *H04B 1/18* (2013.01); *E06B 9/72* (2013.01); *E06B 9/15* (2013.01); *E06B 9/17* (2013.01); *E06B 2009/6809* (2013.01)

(58) Field of Classification Search
CPC ..... H04B 1/18; E06B 9/72; E06B 9/15; E06B 9/17; E06B 2009/6809
See application file for complete search history.

(56) References Cited

U.S. PATENT DOCUMENTS

| 2008/0191658 A1* | 8/2008 | Bruno | ..................... E06B 9/68 318/779 |
| 2009/0258606 A1* | 10/2009 | Ramus | ..................... H01Q 1/44 455/77 |

(Continued)

FOREIGN PATENT DOCUMENTS

FR        2 930 093 A1    10/2009

OTHER PUBLICATIONS

International Search Report and Written Opinion dated Feb. 16, 2016 issued in corresponding application No. PCT/EP2015/076696; w/ English partial translation and partial machine translation (19 pages).

*Primary Examiner* — Nguyen Vo
(74) *Attorney, Agent, or Firm* — Westerman, Hattori, Daniels & Adrian, LLP

(57) ABSTRACT

A device for control by radiofrequency signals (22) of a domestic electrical appliance powered by an electrical power supply network comprising a first electrical conductor (26) and a second electrical conductor (27) for powering the device (22), a coupler (31), a radiofrequency unit (23) comprising an output and/or an input for the radiofrequency signals (28) which is linked electrically to a point of connection (33) of the coupler (31). The coupler (31) is formed by a printed transmission line (32) on a printed circuit board (29), a first end (34) of the line (32) being linked electrically to the first electrical conductor (26) of the device (22), and a second end (35) of the line (32) being linked electrically to a first reference voltage. And the point of connection (33)

(Continued)

of the coupler (31) is disposed between the first and second ends (34, 35) of the printed transmission line (32).

20 Claims, 3 Drawing Sheets

(51) Int. Cl.
*H04B 1/18* (2006.01)
*E06B 9/72* (2006.01)
*E06B 9/15* (2006.01)
*E06B 9/17* (2006.01)
*E06B 9/68* (2006.01)

(56) References Cited

U.S. PATENT DOCUMENTS

| 2010/0081392 A1* | 4/2010 | Rousseau | G08C 17/02 |
| | | | 455/67.14 |
| 2010/0145485 A1* | 6/2010 | Duchene | G05B 19/042 |
| | | | 700/90 |
| 2011/0133995 A1 | 6/2011 | Pascolini et al. | |

* cited by examiner

DEVICE FOR CONTROL BY RADIOFREQUENCY SIGNALS OF A DOMESTIC ELECTRICAL APPLIANCE, ASSOCIATED DOMESTIC ELECTRICAL APPLIANCE AND HOME AUTOMATION INSTALLATION COMPRISING SUCH AN APPLIANCE

The present invention relates to a control device by radiofrequency signals of a home electrical appliance electrically powered by an electrical power supply network.

The present invention also relates to a home electrical appliance, in particular an electromechanical actuator for a home automation closure or solar protection installation, and a home automation closure or solar protection installation including a rollable screen on a roller tube rotated by such an electromechanical actuator.

In general, the present invention relates to the field of privacy devices including a motorized drive device setting in motion a screen between at least a first position and a second position.

A motorized drive device includes an electromechanical actuator of a movable element for closure, privacy or solar protection such as a shutter, a door, a grid, a shade, or any other equivalent equipment, hereafter referred to as a screen.

The document FR 2 930 093 A1 is already known which describes a control device by radiofrequency signals of a home electrical appliance electrically powered by an electrical power supply network.

The control device by radiofrequency signals includes a radiofrequency unit for transmitting and/or receiving radiofrequency signals.

The control device by radiofrequency signals includes a first electrical conductor and a second electrical conductor for electrically powering the control device.

The control device by radiofrequency signals includes an antenna electrically connected to the radiofrequency unit. At least one of the two electrical conductors of the electrical power supply network forms a receiving or transmitting antenna of indeterminate length for the radiofrequency signals.

The control device by radiofrequency signals includes a coupler. The radiofrequency unit includes an output and/or an input for radiofrequency signals electrically connected to a connection point of the coupler.

The control device by radiofrequency signals includes a printed circuit board. The printed circuit board includes the coupler.

The coupler includes at least one coil.

The electrical connection between the output and/or input for radiofrequency signals of the radiofrequency unit and the connection point of the coupler makes it possible to electrically connect the output and/or input for radiofrequency signals of the radiofrequency unit to an additional terminal of the coil located between the two end terminals of the coil.

The coil is implemented in the form of turns printed on the printed circuit board.

The coupler is connected at a first end to the first electrical conductor of the control device by radiofrequency signals and at a second end to a reference voltage of the radiofrequency unit.

The coupler is traversed between its first and second ends by the electrical power supply network current flowing in one of the electrical conductors of the electrical power supply network and powering the home electrical appliance.

However, this control device by radiofrequency signals has the drawback of implementing the coupler by means of a coil formed by turns printed on the printed circuit board of the control device by radiofrequency signals.

In a case where a strong current powers the home electrical appliance, such a coil formed by printed turns creates a large footprint on the printed circuit board because of the width of the tracks of the printed circuit board implementing the coil and the electrical conductor electrically connected to the coil.

Indeed, the dimensioning of these tracks on the printed circuit board is linked to the value of the supply current of the home electrical appliance traversing the coupler consisting of the coil formed by printed turns.

Consequently, the space occupied by the coil on the printed circuit board increases the cost of obtaining the printed circuit board of the control device by radiofrequency signals and requires a housing in the home electrical appliance of significant size for the assembly of the printed circuit board.

In a case where the working frequency of the control device by radiofrequency signals is high, e.g. of the order of 2.4 GHz, such a coil formed by printed turns is small in size.

Consequently, the implementation of the printed circuit board with such a coil formed by printed turns is complex to produce industrially, creates difficulties in ensuring the reliability of the control device by radiofrequency signals, during mass production, and increases the cost of obtaining the printed circuit board for the control device by radiofrequency signals.

The goal of the present invention is to address the aforementioned drawbacks and to provide a control device by radiofrequency signals of a home electrical appliance allowing the installation of a coupler electrically connected to one of the electrical conductors of the electrical power supply network on a printed circuit board of the control device, while overcoming the problems linked to the value of the electrical power supply network current flowing in the coupler and/or to the value of the working frequency of the radiofrequency unit.

To strive toward this goal, the present invention provides for using a printed transmission line in place of the coil provided in the prior art.

In this regard, the present invention is aimed, according to a first aspect, at a control device by radiofrequency signals of a home electrical appliance electrically powered by an electrical power supply network, the device including:
- a first electrical conductor and a second electrical conductor for electrically powering the control device,
- a coupler,
- a radiofrequency unit for transmitting and/or receiving radiofrequency signals including an output and/or an input for radiofrequency signals electrically connected to a connection point of the coupler, so that the coupler matches the output and/or input impedance of the radiofrequency unit,
- a printed circuit board including the coupler.

According to the invention, the coupler is formed by a printed transmission line on the printed circuit board, a first end of the printed transmission line being electrically connected to the first electrical conductor of the control device, and a second end of the printed transmission line being electrically connected to a first reference voltage. And the connection point of the coupler consisting of the printed transmission line is arranged between the first and second ends of the printed transmission line. And, the control device by radiofrequency signals includes an antenna electrically connected to the radiofrequency unit, the antenna comprising at least one of the electrical conductors of the electrical power supply network, the coupler matching the output and/or input impedance of the radiofrequency unit to the impedance of the antenna.

Thus, the installation of the coupler on the printed circuit board of the control device by radiofrequency signals by means of a printed transmission line and the electrical connection of the printed transmission line to one of the electrical conductors of the electrical power supply network makes it possible to overcome the problems linked to the value of the electrical power supply network current flowing in the coupler and/or linked to the value of the working frequency of the radiofrequency unit.

The printed transmission line has a wavelength of the same order of magnitude as the wavelength of the frequency of the signal to be transmitted or received by the radiofrequency unit. The transmission line is characterized by its characteristic impedance, which may be, for example, 50 Ohms.

The printed transmission line is formed by an electrically conductive track, in order to obtain the desired characteristic impedance, and routing an electrical signal from a source to a load, in this case between one of the electrical conductors of the electrical power supply network and the radiofrequency unit, and vice versa, i.e. the signal is routed either from one of the electrical conductors of the electrical power supply network to the radiofrequency unit, or from the radiofrequency unit to one of the electrical conductors of the electrical power supply network.

Moreover, the implementation of the coupler with an intermediate tap made by the connection point of the printed transmission line electrically connected to the output and/or input for radiofrequency signals of the radiofrequency unit enables a characteristic impedance value to be obtained, so as to match the impedance value of the radiofrequency unit.

In this way, the width of the track on the printed circuit board forming the printed transmission line may be adapted according to the value of the electrical power supply network current flowing in the coupler without causing a loss of space on the printed circuit board of the control device by radiofrequency signals.

Furthermore, the implementation of the coupler by means of a printed transmission line makes it possible to create a track with a small footprint on the printed circuit board of the control device by radiofrequency signals, when the working frequency of the radiofrequency unit is high.

The higher the working frequency of the radiofrequency unit, the smaller the wavelength is. Consequently, the length of the coupler decreases.

In this way, producing the coupler by means of a printed transmission line is easier.

Preferably, the printed transmission line forming the coupler is a printed quarter-wave line on the printed circuit board.

According to a preferred feature of the invention, the printed transmission line extends, at least partially, along a direction parallel to the first electrical conductor of the control device.

In practice, in an operating configuration of the control device, the printed transmission line is traversed by the electrical power supply network current flowing in one of the electrical conductors of the electrical power supply network then in the first electrical conductor of the control device and powering the home electrical appliance.

According to another preferred feature of the invention, the control device includes another printed transmission line on the printed circuit board, a first end of the other printed transmission line being electrically connected to the second electrical conductor of the control device, and a second end of the other printed transmission line being electrically connected to a second reference voltage.

Advantageously the control device comprises a capacitor electrically connecting the second end of the other printed transmission line to the second reference voltage.

Preferably, the other printed transmission line extends, at least partially, along a direction parallel to the second electrical conductor of the control device.

According to a second aspect, the present invention is aimed at a home electrical appliance including a control device by radiofrequency signals according to the invention.

This home electrical appliance has features and advantages similar to those previously described in relation to the control device by radiofrequency signals according to the invention.

Preferably, the home electrical appliance is an electromechanical actuator for a home automation closure or solar protection installation.

According to a third aspect, the present invention is aimed at a home automation closure or solar protection installation including a home electrical appliance forming an electromechanical actuator for a home automation closure or solar protection installation and a rollable screen on a roller tube rotated by the electromechanical actuator.

Other features and advantages of the invention will further emerge from the following description.

In the attached drawings, given by way of non-restrictive examples:

Figure 1:
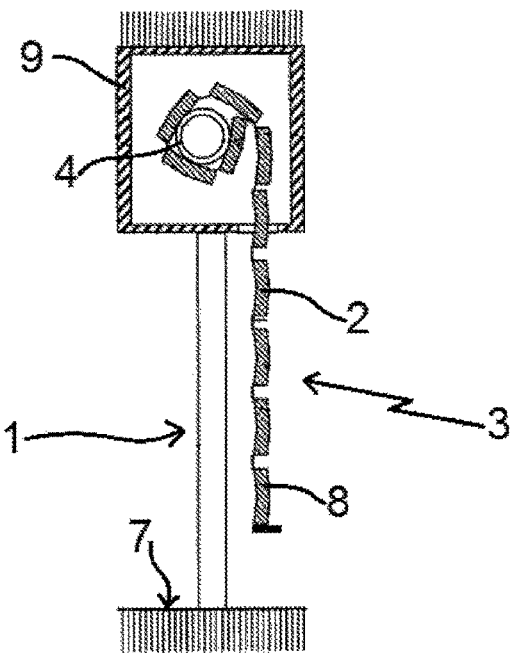
FIG. 1 is a schematic sectional view of a home automation installation in conformity with an embodiment of the invention.
Figure 2:
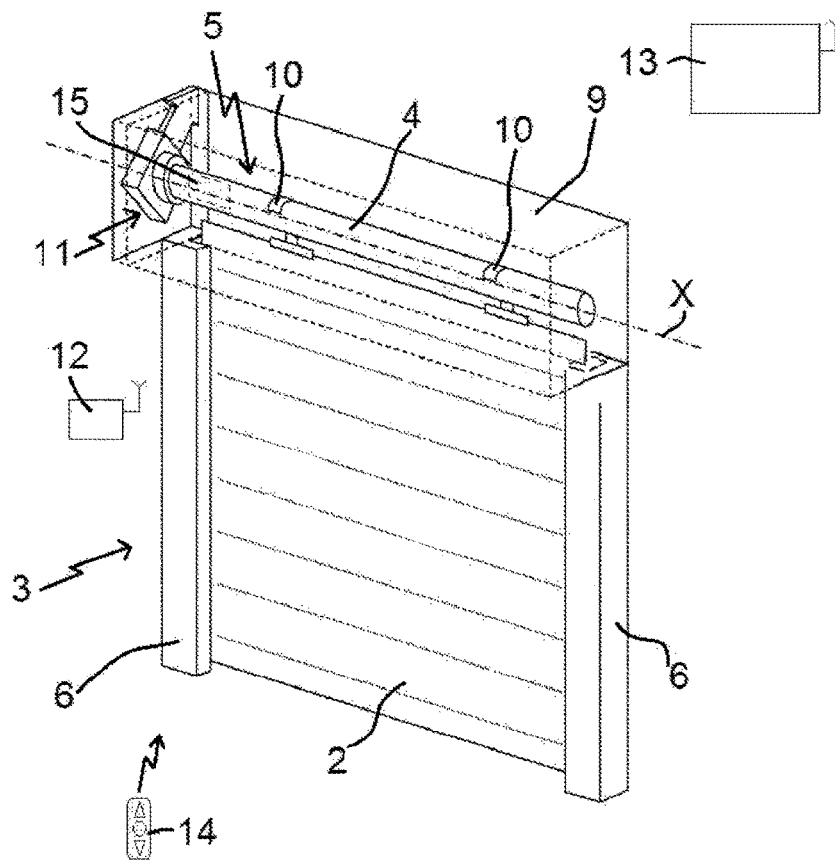
FIG. 2 is a schematic perspective view of the home automation installation illustrated in FIG. 1.
Figure 3:
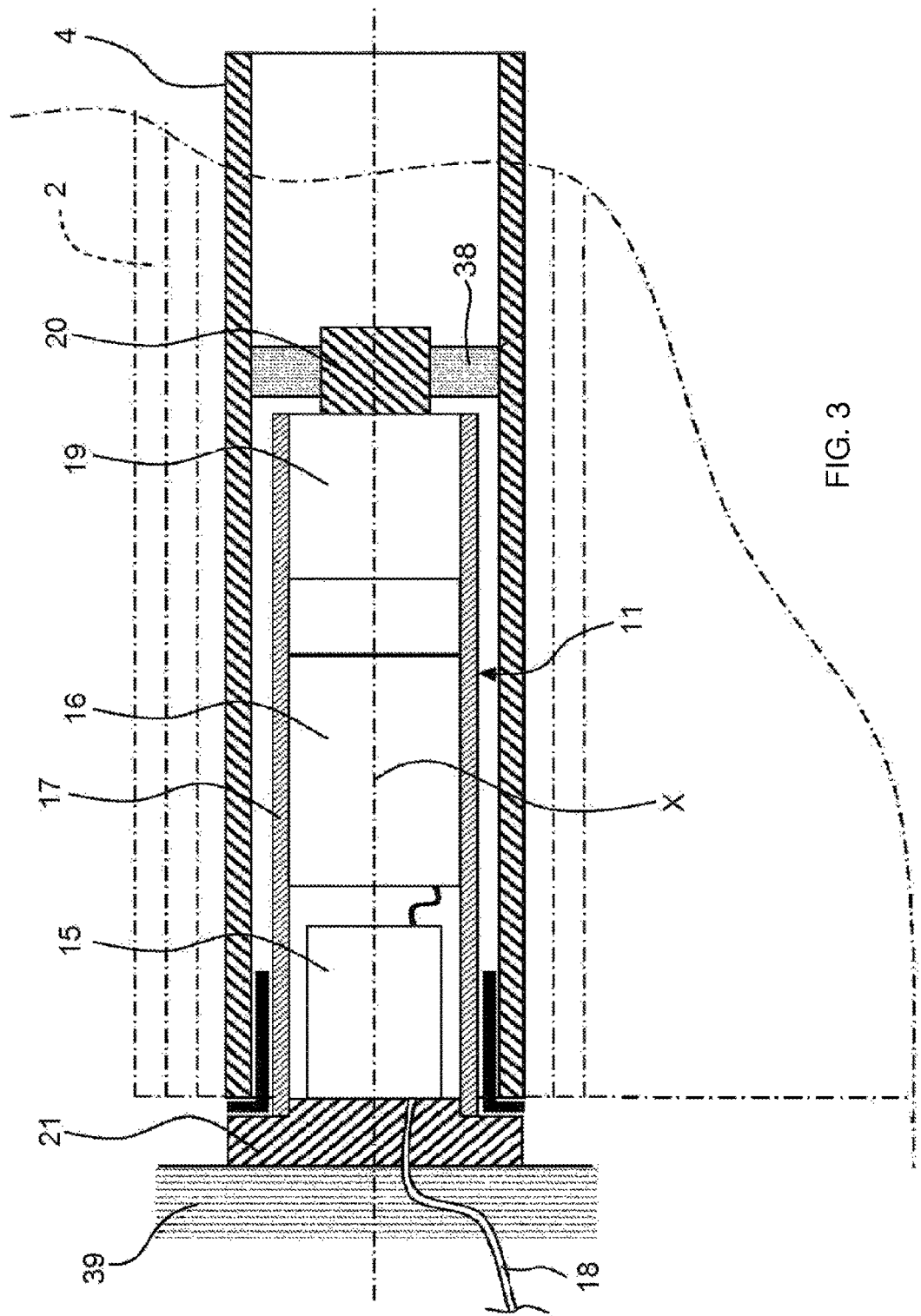
Figure 4:
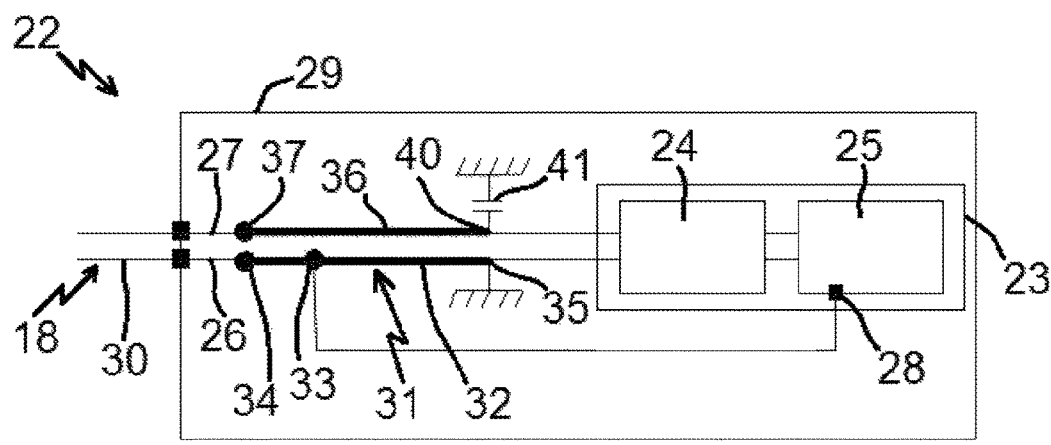

FIG. 3 is a schematic partial sectional view of the home automation installation illustrated in FIG. 2 including an electromechanical actuator in conformity with an embodiment of the invention; and FIG. 4 is a simplified electrical diagram of a control device by radiofrequency signals in conformity with an embodiment of a home electrical appliance belonging to the home automation installation illustrated in FIGS. 1 through 3.

First of all, a description will be given, with reference to FIGS. 1 and 2, of a home automation installation in conformity with a particular embodiment of the invention and installed in a building comprising an opening 1, window or door, provided with a screen 2 belonging to a privacy device 3, in particular a motorized roller shutter.

The privacy device 3 may be a roller shutter, a shade made of fabric or with rotatable slats, or a roller door. Of course, the present invention applies to all types of privacy device.

A description will be given, with reference to FIGS. 1 and 2, of a roller shutter in conformity with an embodiment of the invention.

The screen 2 of the privacy device 3 is rolled on a roller tube 4 driven by a motorized drive device 5 and movable between a rolled-up, in particular high, position and an unrolled, in particular low, position.

The movable screen 2 of the privacy device 3 is preferably a screen for closure, privacy and/or solar protection, being rolled on the roller tube 4 whereof the inside diameter is substantially equivalent to the diameter or to the external dimensions of an electromechanical actuator 11, so that the electromechanical actuator 11 can be inserted into the roller tube 4 during the assembly of the privacy device 3.

The motorized drive device 5 includes the electromechanical actuator 11, in particular a tubular one, for rotating the roller tube 4, so as to unroll or roll up the screen 2 of the privacy device 3.

The privacy device 3 includes the roller tube 4 for rolling up the screen 2, where, in the mounted state, the electromechanical actuator 11 is inserted into the roller tube 4.

In a known manner, a roller shutter 3 comprises a shutter including horizontal slats joined together, forming the screen 2 of the roller shutter 3, and guided by two lateral slides 6. These slats are abutting when the screen 2 reaches its unrolled low position.

In the case of a roller shutter, the high rolled-up position corresponds to the abutment of an L-shaped final end slat 8 of the shutter 2 of the roller shutter 3 against an edge of a housing 9 of the roller shutter 3, and the low unrolled position corresponds to the abutment of the final end slat 8 of the shutter 2 of the roller shutter 3 against a sill 7 of the opening 1, illustrated in FIG. 1.

The first slat of the roller shutter 3, opposite the end slat, is connected to the roller tube 4 by means of at least one joint 10.

The roller tube 4 is arranged inside the housing 9 of the roller shutter 3. The shutter 2 of the roller shutter 3 rolls up and unrolls around the roller tube 4 and is housed at least in part inside the housing 9.

In general, the housing 9 is arranged above the opening 1, or in the upper part of the opening 1.

The motorized drive device 5 is controlled by a control unit. The control unit may be, for example, a local control unit 12, where the local control unit 12 may be connected in a wired or wireless connection with a central control unit 13. The central control unit 13 controls the local control unit 12, as well as other similar local control units distributed in the building.

The central control unit 13 may be in communication with a remote weather station outside the building, including, notably, one or more sensors that may be configured for determining, for example, a temperature, a luminosity, or a wind speed.

A remote control 14, that may be a local control unit, provided with a control keyboard, which includes means of selection and display, further allows a user to intervene on the electromechanical actuator 11 and/or the central control unit 13.

The motorized drive device 5 is, preferably, configured for executing the commands for unrolling or rolling up the screen 2 of the privacy device 3, that may be transmitted, notably, by the remote control 14.

The electromechanical actuator 11 includes an electric motor 16, illustrated in FIG. 3. The electric motor 16 includes a rotor and a stator positioned coaxially about an axis of rotation X.

Control means for the electromechanical actuator 11 in conformity with the invention, enabling the screen 2 of the privacy device 3 to be moved, consist of at least one electronic control unit 15. This electronic control unit 15 is capable of starting up the electric motor 16 of the electromechanical actuator 11, and, in particular, allowing the electric motor 16 to be electrically powered.

Thus, the electronic control unit 15 controls, notably, the electric motor 16, so as to open or close the screen 2, as previously described.

The electronic control unit 15 also includes a module for receiving orders, in particular radio orders transmitted by an order transmitter, such as the remote control 14 intended to control the electromechanical actuator 11.

The module for receiving orders may also allow receiving orders transmitted by wired means.

Here, and as illustrated in FIG. 3, the electronic control unit 15 is arranged inside a casing 17 of the electromechanical actuator 11.

The control means for the electromechanical actuator 11 include hardware and/or software means, notably configured so as to allow the suitable control of the electric motor 16.

By way of example, in no way restrictive, the hardware means may include at least one microcontroller.

A description will now be given, in more detail and with reference to FIG. 3, of the electromechanical actuator 11 belonging to the home automation installation in FIGS. 1 and 2.

The electromechanical actuator 11 is electrically powered by an electrical power supply network of the grid, in particular by the commercial AC network.

The voltage of the electrical power supply network or grid voltage has, for example, a value of 230 Vrms (peak value of 325 V) for the French electrical network, and a frequency of 50 Hz. Of course, the grid voltage may have different values, according to the electrical network of the country in which it is located.

The electromechanical actuator 11 enables the screen 2 of the privacy device 3 to be moved.

Here, the electromechanical actuator 11 includes an electrical power supply cable 18 enabling it to be electrically powered from the electrical power supply network of the grid.

The casing 17 of the electromechanical actuator 11 is, preferably, cylindrical in shape.

In one embodiment, the casing 17 is made of metal.

Of course, the material of the electromechanical actuator casing is in no way restrictive and may be different, and in particular may be made of plastic.

The electromechanical actuator 11 also includes a reduction gear device 19 and an output shaft 20.

The electromechanical actuator 11 may also include an end-of-travel or obstacle detection device, which may be mechanical or electronic.

Advantageously, the electric motor 16 and the reduction gear device 19 are arranged inside the casing 17 of the electromechanical actuator 11.

The output shaft 20 of the electromechanical actuator 11 is arranged inside the roller tube 4, and at least in part outside the casing 17 of the electromechanical actuator 11.

The output shaft 20 of the electromechanical actuator 11 is coupled by a connection means 38 to the roller tube 4, in particular a wheel-shaped connection means.

The electromechanical actuator 11 also includes a closure element 21 on one end of the casing 17.

Here, the casing 17 of the electromechanical actuator 11 is attached to a support 39, in particular a side panel, of the housing 9 of the privacy device 3 by means of the closure element 21 forming a torque support, in particular a closure and torque take-up head. In such a case where the closure element 21 forms a torque support, the closure element 21 is also termed a fixed point of the electromechanical actuator 11.

In this respect, the electromechanical actuator 11 is advantageously both mounted on a fixed point and assembled on the roller tube 4, so as to control the rotation thereof about the axis of rotation X of the roller tube 4.

A description will now be given, with reference to FIG. 4, of the control device by radiofrequency signals of a home electrical appliance electrically powered by an electrical power supply network. This home electrical appliance is formed, in a particular case, by the electromechanical actuator 11 belonging to the home automation installation in FIGS. 1 through 3.

In a particular way, the electronic control unit 15 of the electromechanical actuator 11 includes the control device by radiofrequency signals 22. The control device by radiofrequency signals 22 is, notably, housed inside the casing 17 of the electromechanical actuator 11.

The control device by radiofrequency signals 22 may form an order receiving and/or transmitting module.

The closure element 21 of the electromechanical actuator 11 supports the control device by radiofrequency signals 22.

The electrical power supply cable 18 of the electromechanical actuator 11 includes at least two electrical conductors.

The electrical power supply cable 18 traverses the closure element 21 of the electromechanical actuator 11 at a through opening, and is electrically connected to the electronic control unit 15.

In one embodiment, the electrical power supply cable 18 is electrically connected to the electronic control unit 15 via the socket of an electrical connector of the electrical power supply cable 18 on an electrical connector of the electronic control unit 15.

In another embodiment, the electrical power supply cable 18 is electrically connected to the electronic control unit 15 by inserting the electrical conductors of the electrical power supply cable 18 into an electrical connector of the electronic control unit 15.

Returning to the control device by radiofrequency signals 22, the latter includes, at least, a first electrical conductor 26 and a second electrical conductor 27 for electrically powering the control device by radiofrequency signals 22.

The control device by radiofrequency signals 22 includes a radiofrequency unit 23 for transmitting and/or receiving radiofrequency signals.

The radiofrequency unit 23 includes a power supply circuit 24 and a radiofrequency circuit 25.

The power supply circuit 24 of the radiofrequency unit 23 is electrically powered by the electrical power supply network and, in particular, by the first and second electrical conductors 26, 27 of the control device by radiofrequency signals 22 electrically connected to the electrical conductors of the electrical power supply cable 18, itself connected to the electrical power supply network.

The power supply circuit 24 of the radiofrequency unit 23 includes elements for transforming the voltage of the electrical power supply network into an internal voltage at the radiofrequency unit 23.

Here and in a manner in no way restrictive, the internal voltage at the radiofrequency unit 23 is +5 V.

The internal voltage at the radiofrequency unit 23 electrically powers the radiofrequency circuit 25 of the radiofrequency unit 23.

The radiofrequency unit 23 includes an output and/or an input for radiofrequency signals 28.

The radiofrequency circuit 25 of the radiofrequency unit 23 includes the elements necessary to receiving and/or transmitting radiofrequency signals at the output and/or input for radiofrequency signals 28.

The first and second electrical conductors 26, 27 of the control device by radiofrequency signals 22 are electrically connected to the electrical power supply network, and, in particular to the electrical conductors of the electrical power supply cable 18.

The control device by radiofrequency signals 22 includes a printed circuit board 29.

The electrical conductors of the electrical power supply cable 18, corresponding to a phase electrical conductor and a neutral electrical conductor, are electrically connected to tracks on the printed circuit board 29. The tracks on the printed circuit board 29 form the first and second electrical conductors 26, 27 of the control device by radiofrequency signals 22.

Thus, the control device by radiofrequency signals 22 is electrically powered by the electrical power supply network.

Furthermore, the electrical power supply cable 18 may include a protective electrical conductor. The protective electrical conductor of the electrical power supply cable 18 is connected to the ground and to a metal structure of the electromechanical actuator 11, such as the casing 17 of the electromechanical actuator 11.

The radiofrequency unit 23 of the control device by radiofrequency signals 22 makes it possible to receive signals conveyed by radiofrequency waves.

The radiofrequency signals originate from a transmitter of the local control unit 12 and/or the central control unit 13.

The radiofrequency signals transmitted by the local control unit 12 and/or from the central control unit 13 comprise control orders for the electromechanical actuator 11.

The control orders received by the radiofrequency unit 23 of the control device by radiofrequency signals 22 are processed by the latter and transmitted via an electrical connection from the electronic control unit 15 to the electric motor 16, so as to rotate the roller tube 4 in a first rotation direction or in a second rotation direction or to stop the rotation of the roller tube 4.

In one embodiment, the radiofrequency unit 23 of the control device by radiofrequency signals 22 also makes it possible to transmit signals conveyed by radiofrequency waves.

The radiofrequency signals are transmitted in the direction of a receiver of the local control unit 12 and/or of the central control unit 13.

The radiofrequency signals transmitted by the radiofrequency unit 23 of the control device by radiofrequency signals 22 comprise, notably, information relating to the operation of the electromechanical actuator 11.

Thus, the control device by radiofrequency signals 22 makes it possible to implement a two-way communication, so as to exchange data in transmission and in reception with the local control unit 12 and/or with the central control unit 13.

Alternatively, according to a particular embodiment, the control device by radiofrequency signals 22 only allows implementing a one-way communication, so as to receive control orders from the local control unit 12 and/or from the central control unit 13.

The control device by radiofrequency signals 22 includes an antenna 30 electrically connected to the radiofrequency unit 23, in particular via at least one of the electrical conductors of the electrical power supply network. In particular, the antenna 30 comprises/consists of at least one of the electrical conductors of the electrical power supply network. This antenna 30 is of indeterminate length for radiofrequency signals.

The antenna 30 of the control device by radiofrequency signals 22 makes it possible to capture radiofrequency signals transmitted by the local control unit 12 and/or the central control unit 13 and, optionally, to transmit radiofrequency signals in the direction of the receiver of the local control unit 12 and/or the central control unit 13.

The radiofrequency signals referred to in the context of the present description are, preferably, of the Hertzian type.

The radiofrequency signals are received and/or transmitted by the radiofrequency unit 23 of the control device by radiofrequency signals 22, and, in particular, by means of the antenna 30 via an aerial transmission.

The control device by radiofrequency signals 22 includes a coupler 31. The role of this coupler 31 is, in particular, to match the output and/or input impedance of the radiofrequency unit 22.

In practice, the printed circuit board 29 includes the coupler 31.

The coupler 31 is formed by a printed transmission line 32 on the printed circuit board 29. In particular, a first end 34 of the printed transmission line 32 is electrically connected to the first electrical conductor 26 of the printed circuit board 29 and a second end 35 of the printed transmission line 32 is electrically connected to a reference voltage.

The first transmission line 32 forming the coupler 31 matches the output and/or input impedance of the radiofrequency unit 23 to the impedance of the antenna 30. To do so, the output and/or input for radiofrequency signals 28 is electrically connected to a connection point 33 of the coupler 31. In particular, the connection point 33 of the coupler 31 consisting of the printed transmission line 32 is arranged between the first and second ends 34, 35 of the printed transmission line 32.

Preferably, the printed transmission line 32 forming the coupler 31 is a printed quarter-wave line on the printed circuit board 29.

In what follows, whatever applies to the printed quarter-wave line, or to the "first printed quarter-wave line" in a preferred manner, also applies in the more general context to "the printed transmission line 32 forming the coupler 31".

Thus, the printed quarter-wave line 32 on the printed circuit board 29 forming the coupler 31 is an appropriate printed transmission line, since the latter has a high impedance at the first end 34 while the second end 35 is electrically connected to a reference voltage, i.e. the ground.

A printed quarter-wave line is a piece of transmission line the length of which is equal to one quarter of the electrical wavelength of the conveyed signal. This printed quarter-wave line makes it possible to modify the impedance of the load connected to its end, in particular of the radiofrequency unit 23.

If the printed quarter-wave line is open, i.e. not electrically connected to the load, it has a short circuit at its input, at the frequency of the signal.

If the printed quarter-wave line is short-circuited, it has an infinite impedance at its input, at the frequency of the signal.

If the printed quarter-wave line ends on an impedance lower than its characteristic impedance, the input impedance is greater than the latter, and vice versa.

In this way, the printed quarter-wave line creates an impedance matcher.

The printed quarter-wave line 32 is determined by a characteristic impedance value at the working frequency of the radiofrequency unit 23.

The printed quarter-wave line 32 forming the coupler 31 is hereafter referred to as the first printed quarter-wave line.

Here, the characteristic impedance value of the first printed quarter-wave line 32 is 50 ohms.

The track on the printed circuit board 29 forming the first printed quarter-wave line 32 has a width and a length for determining the impedance value.

The dimensions of the first printed quarter-wave line 32 are dependent on the working frequency of the radiofrequency unit 23. The dimensions of the first printed quarter-wave line 32 are also dependent on the type of substrate forming the printed circuit board 29, as well as the relative permittivity with respect to air of the substrate forming the printed circuit board 29.

In a case where the characteristic impedance value of the first printed quarter-wave line is 50 ohms and the working frequency of the radiofrequency unit 23 is 2.4 GHz, the width of the first printed quarter-wave line 32 is of the order of 2.7 millimeters and the length of the first printed quarter-wave line 32 is of the order of 18 millimeters.

In another case where the characteristic impedance value of the first printed quarter-wave line is 50 ohms and the working frequency of the radiofrequency unit 23 is 868 MHz, the width of the first printed quarter-wave line 32 is of the order of 1 millimeter and the length of the first printed quarter-wave line 32 is of the order of 58 millimeters.

By way of example, in no way restrictive, the substrate of the printed circuit board 29 is made of epoxy resin and is, in particular, of the FR4 type. And the relative permittivity with respect to air of the substrate of the printed circuit board 29 is 4.3.

As mentioned previously, the first end 34 of the first printed quarter-wave line 32 is electrically connected to the first electrical conductor 26 of the printed circuit board 29.

The first electrical conductor 26 of the printed circuit board 29 of the control device by radiofrequency signals 22 is electrically connected to one of the electrical conductors of the electrical power supply cable 18.

The electrical conductor of the electrical power supply cable 18 electrically connected to the first electrical conductor 26 of the printed circuit board 29 of the control device by radiofrequency signals 22 may be a phase electrical conductor or a neutral electrical conductor.

The first printed quarter-wave line 32 is traversed by the electrical power supply network current flowing in one of the electrical conductors of the electrical power supply network, and, in particular, the electrical power supply cable 18, then in the first electrical conductor 26 of the control device by radiofrequency signals 22 and powering the home electrical appliance, in this case the electromechanical actuator 11 and, in particular, the electric motor 16 of the electromechanical actuator 11.

Furthermore, the second end 35 of the first printed quarter-wave line 32 is electrically connected to a first reference voltage, i.e. to the ground.

The first printed quarter-wave line 32 is traversed by the electrical power supply network current powering the home electrical appliance 11. This is a low frequency AC current, e.g. of the order of 50 Hz, the intensity of which may vary according to the operating mode of the home electrical appliance 11.

The output and/or input for radiofrequency signals 28 of the radiofrequency unit 23 is electrically connected to the connection point 33 of the coupler 31, in this case of the first printed quarter-wave line 32.

Here, the electrical connection is made between the connection point 33 of the first printed quarter-wave line 32 and the output and/or input for radiofrequency signals 28 of the radiofrequency unit 23.

The connection point 33 of the first printed quarter-wave line 32 is arranged between the first and second ends 34, 35 of the first printed quarter-wave line 32.

The position of the connection point 33 of the first printed quarter-wave line 32 is determined for obtaining an impedance value of 50 ohms, to match the impedance value of the radiofrequency unit 23.

The printed circuit board 29 includes the track embodying the first printed quarter-wave line 32 at the level of a first layer thereof, and a ground plane implemented at the level of a different layer thereof.

The track of the printed circuit board 29 forming the first printed quarter-wave line 32 has a length of the order of a quarter of the wavelength of the operating frequency of the control device by radiofrequency signals 22.

Advantageously, the track on the printed circuit board 29 forming the first printed quarter-wave line 32 extends along a straight line.

In one embodiment, the first electrical conductor 26 of the control device by radiofrequency signals 22 electrically connected with the coupler 31, formed by the first printed quarter-wave line 32 on the printed circuit board 29, is implemented, at least over a portion of its length, by means of a track on the printed circuit board 29.

The first and second electrical conductors 26, 27 of the control device by radiofrequency signals 22 makes it possible to electrically power the printed circuit board 29 of the control device by radiofrequency signals 22 as well as the electric motor 16 of the electromechanical actuator 11.

Here, the coupler 31 and the first electrical conductor 26 of the control device by radiofrequency signals 22 are respectively implemented by means of a track on the printed circuit board 29.

Notably, the tracks respectively forming the coupler 31 and the first electrical conductor 26 are formed in different planes of the printed circuit board 29.

The tracks of the printed circuit board 29 correspond to metal strips for creating electrical connections. These tracks are generally implemented at the level of a surface of a printed circuit board 29.

The installation of the coupler 31 on the printed circuit board 29 of the control device by radiofrequency signals 22 by means of the first printed quarter-wave line 32 and the electrical connection of the coupler 31 to one of the electrical conductors of the electrical power supply network makes it possible to overcome the problems linked to the value of the electrical power supply network current flowing in the coupler 31 and/or linked to the value of the working frequency of the radiofrequency unit 23.

Moreover, the implementation of the coupler 31 with an intermediate tap made by the connection point 33 of the first printed quarter-wave line 32 electrically connected to the output and/or input for radiofrequency signals 28 of the radiofrequency unit 23 enables a characteristic impedance value to be obtained, so as to match the impedance value of the radiofrequency unit 23.

In this way, the width of the track on the printed circuit board 29 forming the first printed quarter-wave line 32 may be adapted according to the value of the electrical power supply network current flowing in the coupler 31 without causing a loss of space on the printed circuit board 29 of the control device by radiofrequency signals 22.

The intermediate tap implemented on the coupler 31 corresponds to an electrical connection point, so that the first printed quarter-wave line 32 is divided into two parts on each side of this electrical connection point.

The coupler 31 implemented by means of the first printed quarter-wave line 32 on the printed circuit board 29 enables the control device by radiofrequency signals 22 to be operated in a high radiofrequency band, which may be of the order of 2.4 GHz, for example.

In such a case where the working frequency of the control device by radiofrequency signals 22 is of the order of 2.4 GHz, the length of the coupler 31 implemented by means of the first printed quarter-wave line 32 on the circuit board 29 is of the order of 18 millimeters.

Of course, the control device by radiofrequency signals 22 may also operate in another radiofrequency band, which may extend, notably, from 400 MHz to 4 GHz, and may take, notably, values of the order of 433 MHz or 868 MHz.

The coupler 31 implemented by means of the first printed quarter-wave line 32 on the printed circuit board 29 enables the home electrical appliance 11 to be electrically powered with a strong current, which may be of the order of 10 A.

The radiofrequency unit 23 is electrically powered by the electrical power supply network by means of the first and second electrical conductors 26, 27 of the control device by radiofrequency signals 22, where these first and second electrical conductors 26, 27 are respectively implemented by means of a track on the printed circuit board 29 of the control device by radiofrequency signals 22 and electrically connected to an electrical conductor of the electrical power supply network.

Preferably, the first printed quarter-wave line 32 extends, at least partially, along a direction parallel, or even identical, to the first electrical conductor 26 of the control device by radiofrequency signals 22.

Thus, the footprint of the first printed quarter-wave line 32 on the printed circuit board 29 is minimized, since the route of the track forming the first printed quarter-wave line 32 is identical to at least a portion of the track forming the first electrical conductor 26 of the control device by radiofrequency signals 22.

In practice, in an operating configuration of the control device by radiofrequency signals 22, the first printed quarter-wave line 32 is traversed by the electrical power supply network current flowing in one of the electrical conductors of the electrical power supply network then in the first electrical conductor 26 of the control device by radiofrequency signals 22 and powering the home electrical appliance 11.

In one embodiment not represented, where the value of the electricity supply network current flowing in the first printed quarter-wave line 32, implemented in this case by the first quarter-wave line, is high, e.g. of the order of 10 A, an auxiliary electrical conductor is electrically connected to the first printed transmission line 32.

Thus, the auxiliary electrical conductor electrically connected to the first printed transmission line 32 makes it possible for the electrical power supply network current to flow through it in parallel with the first printed transmission line 32, so as to minimize the width of the track on the printed circuit board 29 forming the first printed transmission line 32.

The auxiliary electrical conductor electrically connected to the first printed transmission line 32 is in the form of a wire.

The auxiliary electrical conductor is electrically connected between the first and second ends 34, 35 of the first printed transmission line 32.

The electrical connection of the auxiliary electrical conductor at the first and second ends 34, 35 of the first printed transmission line 32 may be implemented by soldering.

The auxiliary electrical conductor electrically connected to the first printed transmission line 32 extends parallel thereto.

Preferably, the control device by radiofrequency signals 22 includes another printed transmission line 36 on the printed circuit board 29.

Advantageously, the other printed transmission line 36 is a printed quarter-wave line.

The other printed quarter-wave line 36 is hereafter referred to as the second printed quarter-wave line.

Whatever applies to this second printed quarter-wave line may be applied more generally to "said other printed transmission line 36".

A first end 37 of the second printed quarter-wave line 36 is electrically connected to the second electrical conductor 27 of the control device by radiofrequency signals 22. And a second end 40 of the second printed quarter-wave line 36 is electrically connected to a second reference voltage, i.e. to the ground.

Thus, the second printed quarter-wave line 36 makes it possible to isolate the second electrical conductor 27 of the control device by radiofrequency signals 22 from a radiofrequency point of view, so as not to disturb the operation of the antenna 30 implemented by at least one of the electrical conductors of the electrical power supply network.

The second end 35 of the first printed quarter-wave line 32 and the second end 40 of the second printed quarter-wave line 36 may be electrically connected to the same reference voltage. In such a case, the first and second reference voltages may be obtained by the same ground plane of the printed circuit board 29.

Advantageously, the control device by radiofrequency signals 22 comprises a capacitor 41 electrically connecting the second end 40 of the second printed quarter-wave line 36 to the second reference voltage. As illustrated in FIG. 4, the capacitor 41 connects the second end 40 of the second printed quarter-wave line 36 in series to the second reference voltage.

Thus, the capacitor 41 makes it possible to electrically connect the second printed quarter-wave line 36 to the second reference voltage, i.e. to the ground, from a radiofrequency point of view.

Preferably, the second printed quarter-wave line 36 extends, at least partially, along a direction parallel, or even identical, to the second electrical conductor 27 of the control device by radiofrequency signals 22.

Thus, the footprint of the second printed quarter-wave line 36 on the printed circuit board 29 is minimized, since the route of the track forming the second printed quarter-wave line 36 is identical over at least one portion of the track forming the second electrical conductor 27 of the control device by radiofrequency signals 22.

In practice, in the operating configuration of the control device by radiofrequency signals 22, the second printed quarter-wave line 36 is traversed by the electrical power supply network current flowing in one of the electrical conductors of the electrical power supply network then in the second electrical conductor 27 of the control device by radiofrequency signals 22 and powering the home electrical appliance 11.

Advantageously, the first and second printed transmission lines 32, 36 of the control device by radiofrequency signals 22 are printed quarter-wave lines.

Moreover, the first and second printed quarter-wave lines 32, 36 may be implemented by tracks of identical dimensions on the printed circuit board 29 and/or be parallel.

Notably, the tracks of the printed circuit board 29 forming the first and second electrical conductors 26, 27 are respectively connected to the first and second quarter-wave lines 32, 36. These first and second quarter-wave lines 32, 36 are traversed by the electrical power supply network current. The tracks of the printed circuit board 29 forming the first and second electrical conductors 26, 27 are separate from the tracks forming the first and second quarter-wave lines 32, 36.

Advantageously, the track on the printed circuit board 29 forming the second printed quarter-wave line 36 extends along a straight line.

It is clear from what has been described previously, that a home electrical appliance may include a control device such as that described and, notably, form an electromechanical actuator for a home automation closure or solar protection installation.

An installation including multiple home electrical appliances 11 as described previously and, optionally, multiple control units 12, 13, which may be local or central, may be configured for communicating together on the same radiofrequency network using a common protocol and means of identification.

Thanks to the present invention, the installation of the coupler on the printed circuit board of the control device by radiofrequency signals by means of a printed transmission line and the electrical connection of the coupler to one of the electrical conductors of the electrical power supply network makes it possible to overcome the problems linked to the value of the electrical power supply network current flowing in the coupler and/or to the value of the working frequency of the radiofrequency unit.

Of course, many modifications may be made to the embodiments previously described without departing from the scope of the invention.

In particular, the electrical power supply cable may include three electrical conductors, and, notably two phases and a neutral. In such a case, the three electrical conductors of the electrical power supply cable are electrically connected to three tracks on the printed circuit board of the control device by radiofrequency signals.

Moreover, in another embodiment, the home electrical appliance including the control device by radiofrequency signals may be a lighting device, a heating device, notably an infrared terrace heating device, and/or a ventilation or alarm device fitted in a building or in its external environment, such as the garden.

The home electrical device including the control device by radiofrequency signals may also be a sensor for detecting a weather parameter, such as sunshine, wind or humidity, a presence sensor or an alarm sensor.

Moreover, the envisaged embodiments and variants may be combined to generate new embodiments of the invention.

Finally, a home automation closure or solar protection installation may include a home electrical appliance 11 as described and a rollable screen 2 on a roller tube 4 rotated by the electromechanical actuator 11 forming the home electrical appliance.

The invention claimed is:

1. A control device by radiofrequency signals of a home electrical appliance electrically powered by an electrical power supply network, the device including:
    a first electrical conductor and a second electrical conductor for electrically powering the control device,
    a coupler,
    a radiofrequency unit for transmitting and/or receiving radiofrequency signals including an output and/or an input for radiofrequency signals electrically connected to a connection point of the coupler, so that the coupler matches the output and/or input impedance of the radiofrequency unit,
    a printed circuit board including the coupler,
    wherein the coupler is formed by a printed transmission line on the printed circuit board, a first end of the printed transmission line being electrically connected to the first electrical conductor of the control device, and a second end of the printed transmission line being electrically connected to a first reference voltage, wherein the connection point of the coupler consisting of the printed transmission line is arranged between the first and second ends of the printed transmission line, and wherein the control device includes an antenna electrically connected to the radiofrequency unit, the antenna comprising at least one of the electrical conductors of the electrical power supply network, the coupler matching the output and/or input impedance of the radiofrequency unit to the impedance of the antenna.

2. The control device by radiofrequency signals as claimed in claim 1, wherein the printed transmission line forming the coupler is a printed quarter-wave line on the printed circuit board.

3. The control device by radiofrequency signals as claimed in claim 2, wherein the printed transmission line extends at least partially along a direction parallel to the first electrical conductor of the control device.

4. The control device by radiofrequency signals as claimed in claim 3, wherein, in an operating configuration of the control device, the printed transmission line is traversed by the electrical power supply network current flowing in one of the electrical conductors of the electrical power supply network then in the first electrical conductor of the control device and powering the home electrical appliance.

5. The control device by radiofrequency signals as claimed in claim 2, wherein, in an operating configuration of the control device, the printed transmission line is traversed by the electrical power supply network current flowing in one of the electrical conductors of the electrical power supply network then in the first electrical conductor of the control device and powering the home electrical appliance.

6. The control device by radiofrequency signals as claimed in claim 2, wherein the control device includes another printed transmission line on the printed circuit board, a first end of the other printed transmission line being electrically connected to the second electrical conductor of the control device, and a second end of the other printed transmission line being electrically connected to a second reference voltage.

7. The control device by radiofrequency signals as claimed in claim 6, wherein the control device comprises a capacitor electrically connecting the second end of the other printed transmission line to the second reference voltage.

8. The control device by radiofrequency signals as claimed in claim 6, wherein the other printed transmission line extends, at least partially, along a direction parallel to the second electrical conductor of the control device.

9. The control device by radiofrequency signals as claimed in claim 1, wherein the printed transmission line extends at least partially along a direction parallel to the first electrical conductor of the control device.

10. The control device by radiofrequency signals as claimed in claim 9, wherein, in an operating configuration of the control device, the printed transmission line is traversed by the electrical power supply network current flowing in one of the electrical conductors of the electrical power supply network then in the first electrical conductor of the control device and powering the home electrical appliance.

11. The control device by radiofrequency signals as claimed in claim 9, wherein the control device includes another printed transmission line on the printed circuit board, a first end of the other printed transmission line being electrically connected to the second electrical conductor of the control device, and a second end of the other printed transmission line being electrically connected to a second reference voltage.

12. The control device by radiofrequency signals as claimed in claim 11, wherein the control device comprises a capacitor electrically connecting the second end of the other printed transmission line to the second reference voltage.

13. The control device by radiofrequency signals as claimed in claim 11, wherein the other printed transmission line extends, at least partially, along a direction parallel to the second electrical conductor of the control device.

14. The control device by radiofrequency signals as claimed in claim 1, wherein, in an operating configuration of the control device, the printed transmission line is traversed by the electrical power supply network current flowing in one of the electrical conductors of the electrical power supply network then in the first electrical conductor of the control device and powering the home electrical appliance.

15. The control device by radiofrequency signals as claimed in claim 1, wherein the control device includes another printed transmission line on the printed circuit board, a first end of the other printed transmission line being electrically connected to the second electrical conductor of the control device, and a second end of the other printed transmission line being electrically connected to a second reference voltage.

16. The control device by radiofrequency signals as claimed in claim 15, wherein the control device comprises a capacitor electrically connecting the second end of the other printed transmission line to the second reference voltage.

17. The control device by radiofrequency signals as claimed in claim 15, wherein the other printed transmission line extends, at least partially, along a direction parallel to the second electrical conductor of the control device.

18. A home electrical appliance, which includes a control device by radiofrequency signals as claimed in claim 1.

19. The home electrical appliance as claimed in claim 18, which is an electromechanical actuator for a home automation closure or solar protection installation.

20. A home automation closure or solar protection installation including a home electrical appliance as claimed in claim 19 and a rollable screen on a roller tube rotated by the electromechanical actuator forming the home electrical appliance.

* * * * *